US011379459B1

(12) United States Patent
Fedorov et al.

(10) Patent No.: US 11,379,459 B1
(45) Date of Patent: Jul. 5, 2022

(54) ALERTS BASED ON HISTORICAL EVENT-OCCURRENCE DATA

(71) Applicant: Snowflake Inc., Bozeman, MT (US)

(72) Inventors: Andrey Fedorov, San Francisco, CA (US); Maria Polyakova, Newark, CA (US); Omer Singer, Palo Alto, CA (US)

(73) Assignee: Snowflake Inc., Bozeman, MT (US)

( * ) Notice: Subject to any disclaimer, the term of this patent is extended or adjusted under 35 U.S.C. 154(b) by 251 days.

(21) Appl. No.: 16/779,467

(22) Filed: Jan. 31, 2020

(51) Int. Cl.
*G06F 7/00* (2006.01)
*G06F 17/00* (2019.01)
*G06F 16/23* (2019.01)
*G06F 16/2455* (2019.01)
*G06F 9/54* (2006.01)

(52) U.S. Cl.
CPC .......... *G06F 16/2358* (2019.01); *G06F 9/542* (2013.01); *G06F 16/2365* (2019.01); *G06F 16/24556* (2019.01)

(58) Field of Classification Search
None
See application file for complete search history.

(56) References Cited

U.S. PATENT DOCUMENTS

| 2018/0255080 | A1* | 9/2018 | Paine | H04L 63/1425 |
| 2019/0086878 | A1* | 3/2019 | Ranjan | B60H 1/00585 |
| 2019/0121971 | A1* | 4/2019 | Tang | H04L 41/0613 |

* cited by examiner

*Primary Examiner* — Tuan A Pham
(74) *Attorney, Agent, or Firm* — Schwegman Lundberg & Woessner, P.A.

(57) ABSTRACT

Disclosed herein are systems and methods for providing percentile-based alerts from historical event-occurrence data. An embodiment of a method includes identifying a baseline result of an aggregation operation performed with respect to a detection set of attributes of event records. Each baseline result corresponds to a baseline set of one or more event records from a baseline time period within a baseline time window. The method includes determining a subject result of the aggregation operation performed with respect to the detection set of attributes of a subject set of the event records corresponding to a subject time period. The method includes determining, based on the baseline result and the subject result, whether the subject result indicates an alert condition for the detection set for the subject time period, and if so then outputting one or more alerts.

27 Claims, 5 Drawing Sheets

PERCENTILE:

DETECTION SET:

BASELINE TIME WINDOW:

BASELINE TIME PERIOD:

SUBJECT TIME PERIOD:

PERCENTILE MULTIPLIER:

SUBMIT   CANCEL

BASELINE-ALERT CONFIGURATION TOOL

FIG. 4

ALERTS BASED ON HISTORICAL EVENT-OCCURRENCE DATA

TECHNICAL FIELD

The present disclosure relates to databases and alert-distribution systems, and more particularly to systems and methods for providing alerts from historical event-occurrence data.

BACKGROUND

Databases are widely used for data storage and data access in computing applications. A goal of database implementation is to organize enormous amounts of information so that the information can be accessed, managed, and updated, as examples. In a database, data may be organized into rows, columns, and tables. As used herein, a database table is a collection of records (e.g., rows). Each record contains a collection of values of table attributes (e.g., columns). Database tables are typically physically stored in multiple smaller (varying size or fixed size) storage units, e.g., files or blocks. Such files or blocks are referred to herein at times as micro-partitions. In some implementations, micro-partitions are not updated in-place, but rather new micro-partitions are generated and stored to reflect changes to database data.

Database-storage systems can be used for storing different types of content, such as bibliographic content, full-text content, numeric content, alphanumeric content, image content, video content, and/or the like. Further, database systems may be classified according to the organizational approach of the database. There are many different types of databases, including relational databases, distributed databases, cloud-based databases, object-oriented databases, and others.

Databases are often used by various entities (e.g., companies) for storing information that may need to be accessed and/or analyzed. In an example, a database-management company, a financial-services company, and/or the like stores event data reflecting the occurrence of one or more types of events. The event data could take the form of a collection of event records, where each such event record corresponds to an event, to a time period (e.g., a regularly occurring time period), and/or the like. Any types of events could be reflected in the stored event data, such as employee-spending events, user-data-access events, customer-login (and/or login-attempt) events, and/or the like. In many current implementations, numerous rules are put in place—in what can become large, unwieldy rule bases—to trigger one or more alerts upon the occurrence of one or more events as reflected by the stored event records. The manual construction and maintenance (e.g., updating) of such rule bases is quite time-consuming and potentially fraught with data-entry errors, errors in logic and/or errors and time wasted in response due to outdated alerts.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 4 illustrates an example baseline-alert configuration tool, in accordance with at least one embodiment.

DETAILED DESCRIPTION

To address the above-listed and other shortcomings of prior implementations, disclosed herein are systems and methods for providing percentile-based alerts from historical event-occurrence data.

One example embodiment takes the form of a method that includes identifying an Nth-percentile baseline result among a plurality of baseline results of an aggregation operation performed with respect to a detection set of one or more attributes of event records in a database. Each baseline result in the plurality of baseline results corresponds to a baseline set of one or more of the event records, and each such baseline set corresponds to a baseline time period in a plurality of baseline time periods within a baseline time window. Each such baseline time period has a first duration. The method also includes determining a subject result of the aggregation operation performed with respect to the detection set of one or more attributes of a subject set of one or more event records in the database. The subject set corresponds to a subject time period having the first duration. The method also includes determining, based on at least the Nth-percentile baseline result and the subject result, whether the subject result indicates an alert condition for the detection set for the subject time period. The method also includes, based on determining that the subject result indicates the alert condition, outputting one or more alerts.

Another embodiment takes the form of a system that includes at least one processor, and that also includes one or more non-transitory computer readable storage media containing instructions executable by the at least one processor for causing the at least one processor to perform at least the operations that are listed in the preceding paragraph. Still another embodiment takes the form of a computer-storage medium containing instructions executable by the at least one processor for causing the at least one processor to perform at least the operations that are listed in the preceding paragraph.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment, a computer-storage-medium embodiment, and/or one or more other types of embodiments. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

Figure 1:
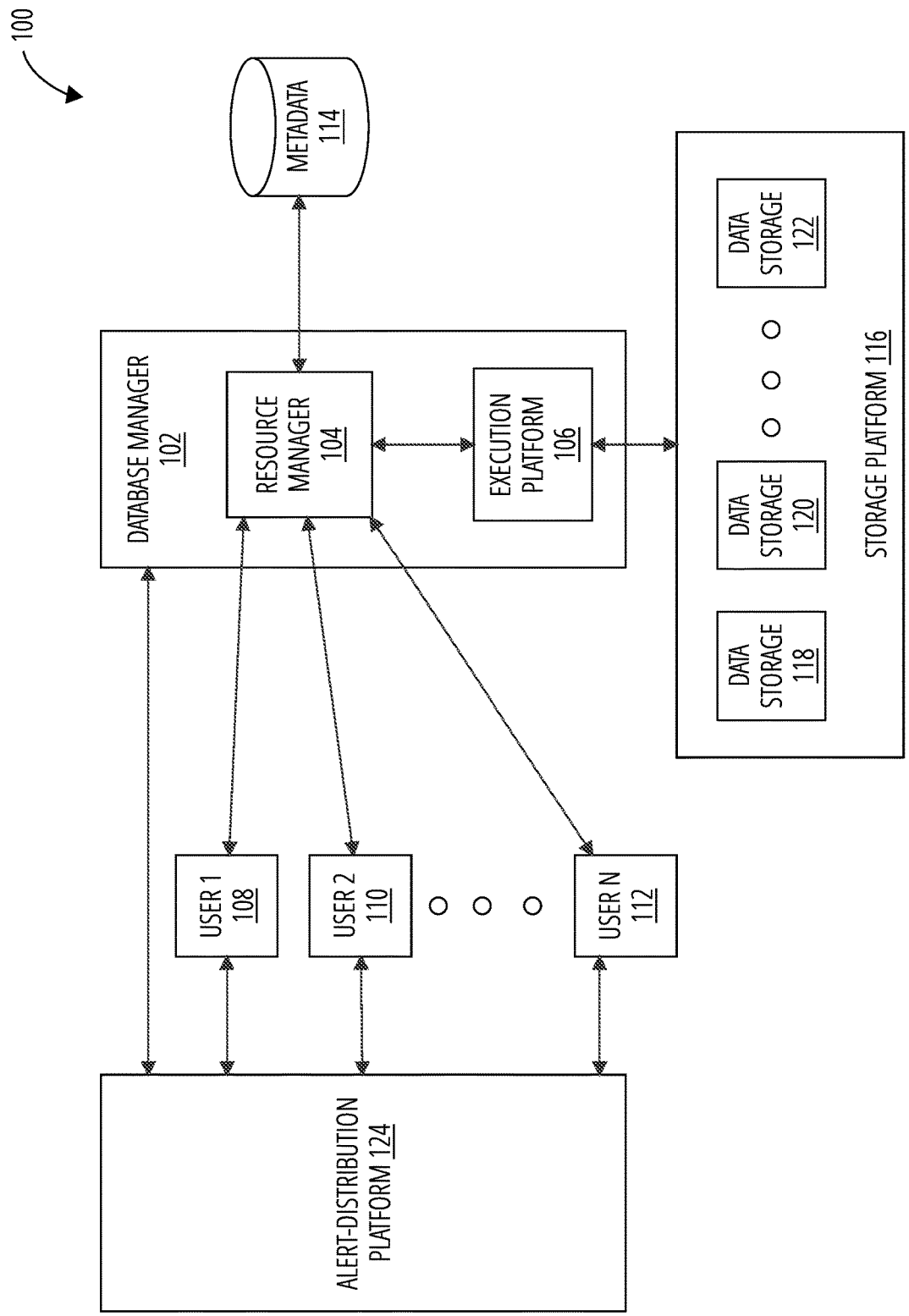
FIG. 1 illustrates an example data-processing platform, in accordance with at least one embodiment.

FIG. 1 illustrates an example data-processing platform 100, in accordance with at least one embodiment. In various embodiments, the data-processing platform 100 may be used for performing one or more of the operations of one or more of the methods (including processes and the like) disclosed herein. As shown in FIG. 1, the data-processing platform 100 includes a database manager 102, which itself includes a resource manager 104 and an execution platform 106, where the execution platform 106 may include one or more execution nodes (e.g., servers, workers, threads, and/or the like). The database manager 102 need not be a defined physical device, though it could be, but in general is used herein as shorthand to refer to the combination of the resource manager 104 and the execution platform 106.

The resource manager 104 may be configured to manage "external" database tasks—such as query requests—that are received from, e.g., a client account. The resource manager 104 may be coupled to any number N of multiple users such as a user 1 108, a user 2 110, and/or through a user N 112. In particular implementations, the resource manager 104 can support any number N of users desiring access to the data-processing platform 100. In at least one embodiment, the user 1 108, the user 2 110, through the user N 112 are not considered part of the data-processing platform 100, but rather they interact with the data-processing platform 100. The user 1 108, the user 2 110, and/or through the user N 112 may include, for example, end users providing data-storage and/or data-retrieval requests, system administrators managing the systems, methods, and devices described herein, and/or one or more other users, components, devices, and/or the like that interact with resource manager 104. The user 1 108, the user 2 110, and/or through the user N 112 may be referred to herein as (e.g., may include) clients, customers, and/or the like and may have a (e.g., direct) connection to one or more deployments as disclosed herein. Each of the user 1 108, the user 2 110, through the user N 112 may be connected to a primary deployment and have the capability to transition the connection from the primary deployment to a secondary deployment, as one example architecture.

The resource manager 104 may be coupled to a store of metadata 114, which in an embodiment is associated with the entirety of data stored throughout the data-processing platform 100. In some embodiments, the metadata 114 includes a summary of data stored in remote data-storage systems as well as data available from a local cache. Additionally, the metadata 114 may include information regarding how data is organized in remote data storage systems and in local caches. The metadata 114 may allow systems and services to determine whether a piece of data needs to be processed (e.g., in connection with a given query) without loading or accessing the actual data from a storage device.

The resource manager 104 may be further coupled to the execution platform 106, which may provide multiple computing resources that execute various data-storage and data-retrieval tasks. In an embodiment, there exists one or more instances of the execution platform 106 used for executing client tasks, such as database queries and/or "internal" database tasks such as updating metadata, clustering a table, generating a materialized view, and so forth. In such an embodiment, there may also exist one or more instances of the execution platform 106 used for incremental feature development and/or testing, and each such instance of the execution platform 106 may be separate from each client instance of the execution platform 106, such that client processing is not impacted by feature-development tasks.

The execution platform 106 may be coupled to multiple data-storage devices such as one or more of a data-storage device 118, a data-storage device 120, and a data-storage device 122 that are part of a storage platform 116. Although three data-storage devices are shown in FIG. 1, the execution platform 106 may be capable of communicating with any number of data-storage devices. In some embodiments, one or more of the data-storage device 118, the data-storage device 120, and the data-storage device 122 are cloud-based storage devices located in one or more geographic locations. For example, one or more of the data-storage device 118, the data-storage device 120, and the data-storage device 122 may be part of a public cloud infrastructure or a private cloud infrastructure. One or more of the data-storage device 118, the data-storage device 120, and the data-storage device 122 may be or include hard disk drives (HDDs), solid state drives (SSDs), storage clusters or any other data-storage technology. Additionally, the storage platform 116 may include distributed file systems (such as Hadoop Distributed File Systems (HDFSs)), object storage systems, and the like.

In particular embodiments, any one or more of the communication links depicted in FIG. 1 could be implemented via one or more data-communication networks, which may utilize any communication protocol and any type of communication medium. In some embodiments, the data-communication networks are a combination of two or more data-communication networks (or sub-networks) coupled to one another. In various different embodiments, these communication links are implemented using any type of communication medium and any communication protocol.

As shown in FIG. 1, the data-storage device 118, the data-storage device 120, and the data-storage device 122 are decoupled from the computing resources associated with the execution platform 106, the resource manager 104, and the database manager 102 generally. In an embodiment, each of a plurality of database deployments includes a respective storage platform 116 having its own respective multiple data-storage devices. This architecture supports dynamic changes to the data-processing platform 100 based on changing data-storage/retrieval needs as well as changing needs of users and systems accessing the data-processing platform 100. The support of dynamic changes allows the data-processing platform 100 to scale quickly in response to changing demands on the systems and components within the data-processing platform 100. The decoupling of the computing resources from the data-storage devices supports the storage of large amounts of data without requiring a corresponding large amount of computing resources. Similarly, this decoupling of computing resources supports a significant increase in the computing resources utilized at a particular time without requiring a corresponding increase in the available data-storage resources.

Also depicted in FIG. 1 is an alert-distribution platform 124, which in some embodiments is considered part of the data-processing platform 100 and in other embodiments is not considered part of the data-processing platform 100. The alert-distribution platform 124 may perform a number of different operations, including being configured to perform one or more of the methods described in the present disclosure. In operation, the alert-distribution platform 124 may receive alerts (e.g., alert-related messages, commands, and/or the like) from the database manager 102 and may responsively distribute one or more alerts to one or more destinations (e.g., devices associated with one or more of user 1 108, user 2 110, and/or through user N 112). The alert-distribution platform 124 could use one or more of any suitable alert-distribution and/or message-distribution formats, tools, and/or the like. The alert-distribution platform 124 could distribute alerts as e-mails, text messages, alerts pushed to apps (e.g., mobile apps), files stored in a particular storage location, updates to existing stored files and/or other records, and/or the like. In some embodiments, the alert-distribution platform 124 uses an alert-distribution framework known as Comet, which was developed by Spotify Technology S.A., which is headquartered in Stockholm, Sweden. Other alert-distribution solutions could be used as well or instead. Further operations performed by the alert-distribution platform 124 in at least some embodiments are described below.

Any of the components, devices, systems, and/or the like that are depicted in FIG. 1 could be implemented as one or more computing devices having an architecture similar to the example computing device that is described below in connection with FIG. 5. The database manager 102, the resource manager 104, the execution platform 106, the metadata 114, the storage platform 116, and the alert-distribution platform 124 are shown in FIG. 1 as components. However, each of the resource manager 104, the execution platform 106, the metadata 114, the storage platform 116, and the alert-distribution platform 124 may be implemented as a distributed system (e.g., distributed across multiple systems, platforms, and/or the like at multiple geographic locations). Additionally, each of the database manager 102, the resource manager 104, the execution platform 106, the metadata 114, the storage platform 116, and the alert-distribution platform 124 can be scaled up or down (independently of one another) depending on changes to the requests received from users and the changing needs of the data-processing platform 100. Thus, the data-processing platform 100 is dynamic and supports regular changes to meet changing data-processing needs.

Figure 2:
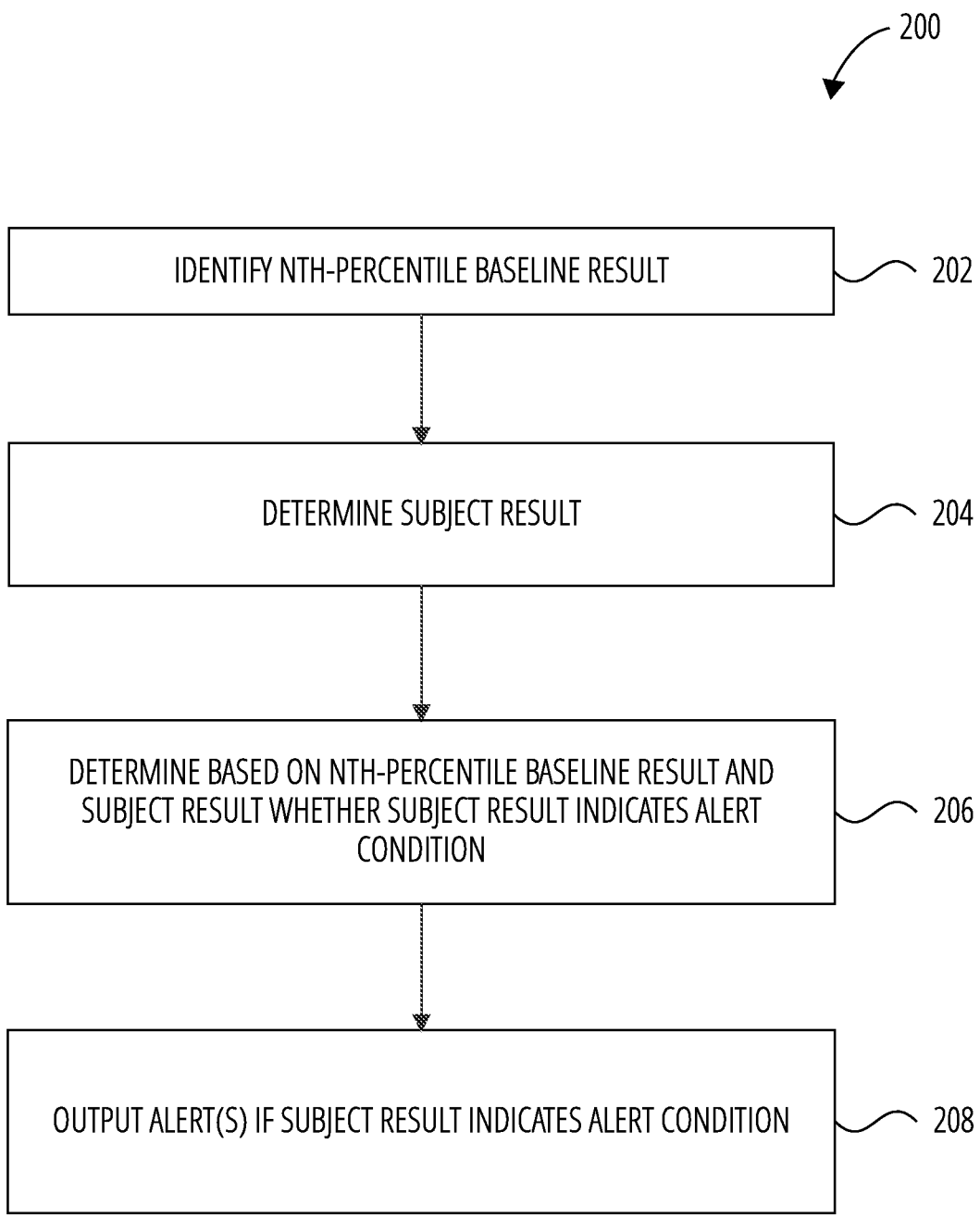
FIG. 2 illustrates an example method, in accordance with at least one embodiment.

FIG. 2 illustrates an example method 200, in accordance with at least one embodiment. In various different embodiments, the method 200 could be performed by any computing and communication device or system of such devices that is suitably equipped, programmed, and configured to perform the operations described herein. By way of example and not limitation, the method 200 is described below as being performed by the alert-distribution platform 124. In other embodiments, all or part of the method 200 is performed by the database manager 102, which may involve one or more aspects of the method 200 being performed by the resource manager 104, one or more aspects of the method 200 being performed by the execution platform 106, and/or one or more aspects of the method 200 being performed by one or more other functional components of the database manager 102. In at least one embodiment, the method 200 is performed periodically with respect to one or more data sets.

Prior to delving into the specifically described operations of the method 200, it is noted that, in some embodiments, the method 200 involves the generation and outputting of alerts based on monitored event records indicating a threshold condition, where that threshold condition takes into account a set of historical data for meaningful comparison with a recent value. The event records may be stored in, e.g., a Structured Query Language (SQL) table. By way of terminology, the set of historical data used in this comparison is referred to herein as baseline data, and the records, time periods, time windows, and the like that pertain to the historical data are referred to using the "baseline" modifier. Moreover, the data (and associated records, time periods, time windows, and the like) that is being compared with the baseline data to potentially trigger one or more alerts is referred to using the "subject" modifier. As an example, a subject result of an aggregation function could refer to a most recent result of the aggregation function performed on event records associated with a most recent, subject time period (e.g., hour). Moreover, as discussed more fully below, the examples described herein for the most part pertain to a counting function as an example aggregation function that is used on both baseline data and subject data, though other aggregation functions (sum, average, etc.) are used in other embodiments.

Moving now to the particularly depicted operations of the method 200, at operation 202, the alert-distribution platform 124 identifies an Nth-percentile baseline result among a plurality of baseline results of an aggregation operation performed with respect to a detection set of one or more attributes of event records in a database. Each baseline result in the plurality of baseline results corresponds to a baseline set of one or more of the event records, and each such baseline set corresponds to a baseline time period in a plurality of baseline time periods within a baseline time window. Each such baseline time period has a first duration.

Figure 3:
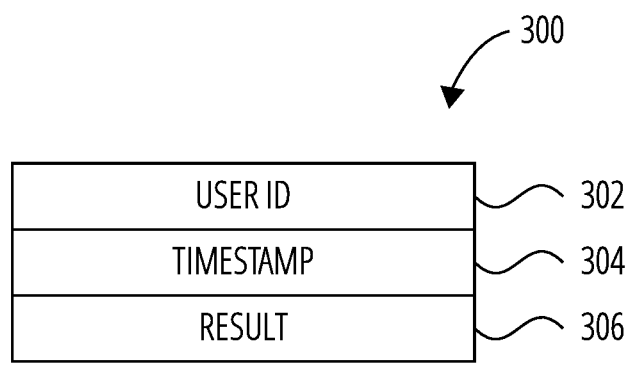
FIG. 3 illustrates an example login-attempt record, in accordance with at least one embodiment.

To illustrate and further expound on the terms used in the operation 202, an example is provided using the example context of customer login attempts for illustration. In the example scenario, the data-processing platform 100 receives a feed of login-attempt event records, an example one of which is shown in FIG. 3. As shown in the example login-attempt record 300, the included fields are a user ID 302, a timestamp 304, and a result 306. The user ID 302 represents the user ID associated with the login attempt. The timestamp 304 indicates a date and time when the login attempt occurred. The result 306 indicates whether the login attempt was successful or not. And certainly other fields could be included as well, such as source IP address of the login attempt, which could then be mapped to, e.g., a city from which the login attempt originated, and so forth. The fields illustrated in FIG. 3 are for presentation of an example and not by way of limitation.

Further to this example, the following assumptions are made, again purely by way of example: N is 90, and thus it is a 90th-percentile baseline result, explained more fully below, that is identified at operation 202. The aggregation operation in this example is counting. The detection set in this example is the two attributes {user ID, result}. These attributes may be stored in respective columns (along with timestamp) in a database table. In general, as used herein, a detection set is a set of one or more attributes on which the relevant aggregation is being conducted. Thus, a detection set could be just {user ID}, in which case all login attempts would be aggregated for each user ID, rather than just the failed login attempts, which is the case with the example being presented here where the detection set is {user ID, result}.

In this example, each baseline result corresponds to a baseline set that contains a single baseline record: the number of failed login attempts for the given user ID in a given hour. Thus, in this example, the baseline time period (and the associated "first duration") is one hour, and the baseline time window is assumed in this example to be 30 days. Other baseline time periods having other durations (e.g., 1 minute, 10 seconds, 1 week, 1 month, etc.) could be used, as could other baseline time windows (e.g., 24 hours, 60 days, 1 year, etc.). Thus, in this example, each baseline result is a counted number, aggregated by the alert-distribution platform 124, of failed login attempts for a given user ID in each hour of the previous 30 days. To determine the 90th-percentile baseline result among these baseline results, the alert-distribution platform 124 could sort the baseline results in descending order of counted failed login attempts and then identify the record in that sorted array that is 1/10th of the way into the list. In other embodiments, the alert-distribution platform 124 could identify the Nth-percentile result (in this case the 90th-percentile result) using a percentile-approximation function such as the SQL function APPROX_PERCENTILE. Such a function may involve making a single pass through unsorted data and identifying at least an approximation of a specified percentile. Other methods could be used as well.

In this example, just for illustration, the 90th-percentile result is assumed to be 15 failed login attempts. That is, in this example, 15 failed login attempts in one hour represents more failed login attempts than occurred in 90 percent of the hours in the previous 30 days. In some embodiments, the alert-distribution platform 124 performs the aggregation operation at least in part by using a group-by operation (e.g., the SQL GROUP BY operation) to group event records that correspond to the baseline time window according to the detection set of one or more attributes. In an example, the aforementioned group-by operation performs an operation to group such event records by time period.

At operation 204, the alert-distribution platform 124 determines a subject result of the aggregation operation performed with respect to the detection set of one or more attributes of a subject set of one or more event records in the database, where the subject set corresponds to a subject time period having the first duration. In this example, the subject time period is the most recent hour, and the subject set is all login-attempt event records occurring during that hour. It is noted that the subject time period and each baseline time period have the same "first" duration: in this example, one hour. The aggregation operation is the same: counting. As stated, the subject set of event records is all login-attempt event records for that user ID over the most recent hour. The subject result in this example is the count of how many failed login attempts were made by (e.g., from, associated with, etc.) that user ID in the preceding hour. The detection set remains the same two attributes: {user ID, result}. Thus, the aggregation operation involves counting all occurrences of event records for the subject user ID where the result field indicates a failed login attempt. In this example, purely by way of illustration and not limitation, the subject result is 173 failed login attempts from that user ID in the previous hour.

At operation 206, the alert-distribution platform 124 determines, based on at least the Nth-percentile (in this case, 90th-percentile) baseline result and the subject result, whether the subject result indicates an alert condition for the detection set for the subject time period, which is the previous hour. In some embodiments, the alert-distribution platform 124 simply compares the subject result with the baseline result, and determines that an alert condition is indicated if the subject result is greater (or less than) the Nth-percentile baseline result. Thus, in the present example, an alert condition could be indicated simply because the subject result of 173 failed login attempts exceeds the 90th-percentile baseline result of 15 failed login attempts.

In other embodiments, the Nth-percentile baseline result is modified prior to being compared with the subject result. Equivalently, the subject result could be modified for comparison with the Nth-percentile baseline result. In some embodiments, the Nth-percentile baseline result is modified by application of a scalar multiplier prior to being compared with the subject result. In some embodiments, the following inequality is evaluated, where the ">" sign represents a logical test for whether "C" is greater than the expression on the right side of the ">" sign:

$$C > (pctN(W,G)) * T$$

where:

"C" represents the count of events, referred to herein as the subject result;

"pctN" represents the Nth percentile;

"W" represents the baseline time window;

"G" represents the detection set of one or more attributes; and

"T" represents the scalar multiplier mentioned above.

Continuing the above example, if T were equal to 10, the subject result of 173 failed login-attempts in the previous hour would exceed the product of the 90th-percentile result (15 failed login attempts) and the scalar multiplier (10). As such, in that example, an alert condition would be indicated.

In some embodiments, the alert-distribution platform 124 provides a user interface tool in which a user is able to set up the monitoring of a stream of event records in accordance with the present disclosure, including by specifying values for, e.g., N, W, and/or T. In embodiments in which a user can specify one or more parameters of the above equation, a parameter being left unspecified could simply result in a default value being used for that parameter. For any one or more parameters that are specified by a user, the alert-distribution platform 124 may responsively conduct the herein-described aggregation calculations according to the one or more specified parameters. FIG. 4 shows an example baseline-alert configuration tool 400 in which a user can set up monitoring in accordance with the present disclosure by specifying one or more of percentile (N), detection set (G) (by selecting one or more attributes), baseline time window (W), baseline time period, subject time period, and percentile multiplier. It is noted that some of those parameters do not appear in the above inequality, though it will be appreciated from the description herein that these parameters are relevant to the monitoring of event records in accordance with the present disclosure. In an example, the above inequality can include an operation of "modulo P" since both sides of the inequality depend on the length of the period. In some embodiments, such a configuration tool includes a field for specifying a particular data table or stream of input records on which to perform the aggregation and monitoring in accordance with the present disclosure.

At operation 208, if it is determined at operation 206 that the subject result indicates an alert condition for the detection set for the subject time period, the alert-distribution platform 124 then outputs one or more alerts. In various different embodiments, operation 208 may involve outputting one or more alerts to one or more different entities. In embodiments in which the method 200 is performed in whole or in part by the database manager 102, operation 208 may include outputting one or more alerts to and/or via the alert-distribution platform 124. In some embodiments, the one or more alerts are output (by, e.g., the database manager 102 and/or the alert-distribution platform 124) to a user interface, an alert report, and/or data storage, as further examples. Other examples of destinations to which alerts can be output are listed above in connection with FIG. 1.

Some further variations on the method 200 are described below.

In some embodiments, the alert-distribution platform 124 performs the herein-described aggregation with respect to all of the baseline time periods within the baseline time window. Continuing the above example, if operating in this manner, the alert-distribution platform 124 would determine the 90th-percentile result based on every single hour in the previous 30 days.

In other embodiments, the alert-distribution platform 124 performs the herein-described aggregation with respect to less than all of the baseline time periods with the baseline time window. For example, in cases in which the aggregation operation is a counting operation, the alert-distribution platform 124 may exclude from the determination any time periods within the baseline time window having a zero count of instances corresponding to the detection set. Thus, in our example, the alert-distribution platform 124, if operating in this manner, would exclude all hours in which there were no failed login attempts associated with the given user ID. In other embodiments, the alert-distribution platform 124 may select a certain number (e.g., 100) of the time periods within the baseline time window that have the highest (or lowest) values (e.g., counts), and designate those selected time periods as being the baseline time periods for use in determining the Nth-percentile baseline result.

Another variant in some embodiments is that, although event records may be kept according to a certain time period (e.g., every hour), the baseline time periods used in the method 200 could be pre-aggregations of such component time periods. For example, the login-attempt records could be aggregated from one-hour-based records to baseline time periods in terms of a 24-hour day, a week, a month, and/or the like. In such embodiments, the subject time period may also be a similar pre-aggregation of shorter-duration, component time periods, in order to smooth hourly counts by considering longer timeframes. These pre-aggregations could take the form of sums, averages, and/or the like with respect to, e.g., the count values of the component time periods that make up any given pre-aggregation. In some embodiments, one or more such pre-aggregations are computed prior to receiving specification of one or more parameters via, e.g, the baseline-alert configuration tool 400. In such cases, identifying the Nth-percentile result at operation 202 may involve accessing a pre-computed Nth-percentile baseline result. In other embodiments, the Nth-percentile baseline result is identified after receiving specification of one or more parameters from a user.

In some embodiments, a user may specify one or more values of one or more attributes in the detection set, and the results of the aggregation operation may accordingly be specific to the specified one or more values of the one or more attributes in the detection set. For example, a user may specify a particular user ID for monitoring in accordance with the above examples, and the alert-distribution platform 124 may aggregate and alert based only on that specified user ID. In other embodiments, the alert-distribution platform 124 may aggregate and alert based on all user IDs, triggering an alert if any one of them experiences a data spike (e.g., count) in a given time period according to the present disclosure.

In some instances, the subject time period is within (e.g., a last hour of) the baseline time window. In other instances, the subject matter is not within (e.g., the hour just after) the baseline time window.

In some embodiments, none of the baseline time periods overlaps any other baseline time period. For example, each baseline time period could be a discrete hour in the previous 30 days. In other embodiments, at least one of the baseline time periods overlaps at least one other baseline time period. For example, the baseline time periods could be aggregations of hour-long component time periods into 24-hour baseline time periods that do overlap.

It is also explicitly noted that an Nth-percentile baseline result—or one that is modified by, e.g., a scalar multiplier—could trigger one or more alerts by being either above or below a given subject result. Thus, in some implementations, it could be the lack of occurrence or rarity of occurrence of a given event that is noteworthy, as opposed to a spike in a number of occurrences of the given event.

As a general matter, embodiments of the present disclosure provide generic and universal data-modeling tools that result from the separation of the concepts of defining a data model from applying the defined data model to actual data, thereby providing a generalized, powerful tool. In certain embodiments, users need only specify a relatively small number of parameters such as the desired percentile, the detection set, and/or the baseline time window. Furthermore, embodiments of the present disclosure can be used on any type of event data and can use any aggregation function. Thus, a universal framework is provided for triggering alerts based on spikes in event data that bear a predefined (e.g., user-defined) relationship to historical values for that same event data.

Moreover, although the examples primarily discussed above involve login-attempt records, embodiments of the present disclosure are applicable to innumerable other contexts and types of records, including other types of event records. As one example, employee spending on a company card could be tracked on a per-day, per-week, and/or per-month basis, with historical data providing context for using percentiles to determine whether to trigger one or more alerts. As another example, access to certain data repositories (e.g., files, folders, servers, abstractions such as buckets, and/or the like) by certain users and/or certain systems could be tracked on any suitable time frame, with historical data for such data-access events providing meaningful context for making percentile-based determinations regarding whether or not to trigger one or more alerts.

Furthermore, in some embodiments, the alert-distribution platform 124 or other entity or entities performing the herein-described functions pre-compute one or more Nth-percentile baseline results. Some example percentiles for which such pre-computations may be carried out include the 99th, the 95th, the 90th, the 50th, the 10th, the 5th, and the 1st. Certainly any one or more other Nth-percentile baseline results could be pre-computed as well or instead.

Figure 5:
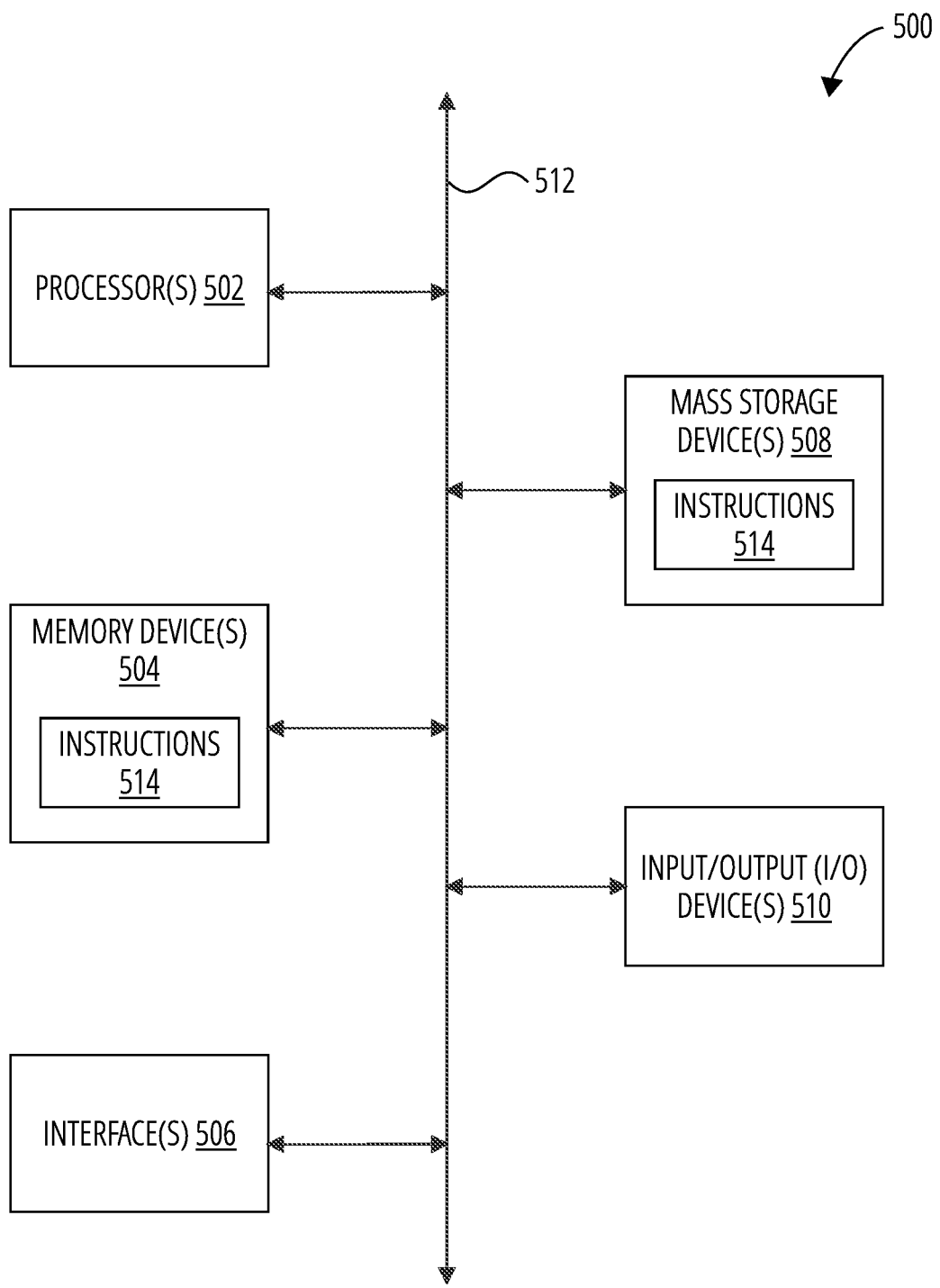
FIG. 5 illustrates an example computing device, in accordance with at least one embodiment.

FIG. 5 illustrates an example computing device 500, in accordance with at least one embodiment. In some embodiments, the computing device 500 is used to implement one or more of the systems and components discussed herein. For example, the computing device 500 may allow a user or administrator to access the resource manager 104. Further, the computing device 500 may interact with any of the systems and components described herein. Accordingly, the computing device 500 may be used to perform various procedures and tasks, such as those discussed herein. The computing device 500 can function as a server, a client, or any other computing entity. The computing device 500 can be any of a wide variety of computing devices, such as a desktop computer, a notebook computer, a server computer, a handheld computer, a mobile device, a tablet, and/or the like.

In the depicted embodiment, the computing device 500 includes one or more processor(s) 502, one or more memory device(s) 504, one or more interface(s) 506, one or more mass storage device(s) 508, and one or more input/output device(s) 510, all of which are coupled to a bus 512. The processor(s) 502 include one or more processors or controllers that execute instructions stored in the memory device(s) 504 and/or the mass storage device(s) 508. The processor(s) 502 may also include various types of computer-readable media, such as cache memory.

The memory device(s) 504 can include various computer-readable media, such as volatile memory (e.g., random access memory (RAM)) and/or nonvolatile memory (e.g., read-only memory (ROM)). The memory device(s) 504 may also include rewritable ROM, such as Flash memory.

The interface(s) 506 may include various interfaces that allow the computing device 500 to interact with other systems, devices, or computing environments. Example interface(s) 506 include any number of different network interfaces, such as interfaces to local area networks (LANs), wide area networks (WANs), wireless networks, the Internet, and/or the like.

The mass storage device(s) 508 may include various computer readable media, such as magnetic tapes, magnetic disks, optical disks, solid state memory (e.g., Flash memory), and so forth. Various drives may also be included in the mass storage device(s) 508 to enable reading from and/or writing to the various computer readable media. The mass storage device(s) 508 may include removable media and/or non-removable media.

The input/output device(s) 510 may include various devices that allow data and/or other information to be input to and/or retrieved from the computing device 500. Example input/output device(s) 510 include cursor-control devices, keyboards, keypads, microphones, monitors or other display devices, speakers, printers, network interface cards, modems, lenses, CCDs or other image capture devices, and the like.

The bus 512 allows the processor(s) 502, the memory device(s) 504, the interface(s) 506, the mass storage device(s) 508, and the input/output device(s) 510 to communicate with one another, as well as with other devices or components that may be coupled to the bus 512. The bus 512 represents one or more of several types of bus structures, such as a system bus, PCI bus, IEEE 1394 bus, USB bus, and/or the like.

For purposes of illustration, programs and other executable program components are shown herein as discrete blocks, although it is understood that such programs and components may reside at various times in different storage components of the computing device 500 and are executed by the processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Executable Instructions and Machine Storage Medium

The various memories may store one or more sets of instructions 514 and data structures (e.g., software) embodying or utilized by any one or more of the methodologies or functions described herein. These instructions 514, when executed by the processor(s) 1402, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, any network or portion network described herein may include a wireless or cellular network, and a utilized coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 514 may be transmitted or received over a network using a transmission medium via a network interface device (e.g., a network interface component) and utilizing any one of a number of well-known transfer protocols (e.g., hypertext transfer protocol (HTTP)). Similarly, the instructions 514 may be transmitted or received using a transmission medium via a coupling (e.g., a peer-to-peer coupling) to one or more devices. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 514 for execution by the computing device 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

As stated above, the terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

For purposes of illustration, programs and other executable program components are shown herein as discrete blocks, although it is understood that such programs and components may reside at various times in different storage components of the computing device 1400 and are executed by the processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Examples of Embodiments

Following is a list of some examples of embodiments.

Example 1 is a method that includes identifying an Nth-percentile baseline result among a plurality of baseline results of an aggregation operation performed with respect to a detection set of one or more attributes of event records in a database, each baseline result in the plurality of baseline results corresponding to a baseline set of one or more of the event records, each such baseline set corresponding to a baseline time period in a plurality of baseline time periods within a baseline time window, each such baseline time period having a first duration; determining a subject result of the aggregation operation performed with respect to the detection set of one or more attributes of a subject set of one or more event records in the database, the subject set corresponding to a subject time period having the first duration; determining, based on at least the Nth-percentile baseline result and the subject result, whether the subject result indicates an alert condition for the detection set for the subject time period; and based on determining that the subject result indicates the alert condition, outputting one or more alerts.

Example 2 is the method of Example 1, where the Nth-percentile baseline result corresponds to a percentile level N, the method further including receiving a percentile-level indication via a user interface, and responsively setting the percentile level N for the aggregation operation based at least in part on the received percentile-level indication.

Example 3 is the method of either Example 1 or Example 2, where the plurality of baseline time periods constitutes all of the baseline time periods within the baseline time window.

Example 4 is the method of either Example 1 or Example 2, where the plurality of baseline time periods does not constitute all of the baseline time periods within the baseline time window.

Example 5 is the method of Example 4, where the aggregation operation includes a counting operation; and the plurality of baseline time periods does not include any time periods within the baseline time window having a zero count of instances corresponding to the detection set.

Example 6 is the method of any of the Examples 1-5, further including receiving a detection-set specification via a user interface, and responsively setting the detection set for the aggregation operation based at least in part on the received detection-set specification.

Example 7 is the method of any of the Examples 1-6, where determining, based on at least the Nth-percentile baseline result and the subject result, whether the subject result indicates the alert condition for the detection set for the subject time period includes: generating a modified Nth-percentile baseline result based on the Nth-percentile baseline result, where generating the modified Nth-percentile baseline result based on the Nth-percentile baseline result comprises multiplying the Nth-percentile baseline result by a scaling coefficient; comparing the subject result to the modified Nth-percentile baseline result; determining whether the subject result indicates an alert condition for the detection set for the subject time period based on the comparing.

Example 8 is the method of any of the Examples 1-7, further including receiving a first-duration specification via a user interface, and responsively setting the first duration for the aggregation operation based at least in part on the received first-duration specification.

Example 9 is the method of any of the Examples 1-8, further including receiving a time-window-duration specification via a user interface, and responsively setting the baseline time window for the aggregation operation based at least in part on the received time-window-duration specification.

Example 10 is the method of any of the Examples 1-9, where outputting one or more alerts includes outputting one or more alerts to one or more of an alert-distribution platform, a user interface, an alert report, and data storage.

Example 11 is a system including at least one processor; and one or more non-transitory computer readable storage media containing instructions executable by the at least one processor for causing the at least one processor to perform operations including: identifying an Nth-percentile baseline result among a plurality of baseline results of an aggregation operation performed with respect to a detection set of one or more attributes of event records in a database, each baseline result in the plurality of baseline results corresponding to a baseline set of one or more of the event records, each such baseline set corresponding to a baseline time period in a plurality of baseline time periods within a baseline time window, each such baseline time period having a first duration; determining a subject result of the aggregation operation performed with respect to the detection set of one or more attributes of a subject set of one or more event records in the database, the subject set corresponding to a subject time period having the first duration; determining, based on at least the Nth-percentile baseline result and the subject result, whether the subject result indicates an alert condition for the detection set for the subject time period; and based on determining that the subject result indicates the alert condition, outputting one or more alerts.

Example 12 is the system of Example 11, where the Nth-percentile baseline result corresponds to a percentile level N, the method further including receiving a percentile-level indication via a user interface, and responsively setting the percentile level N for the aggregation operation based at least in part on the received percentile-level indication.

Example 13 is the system of either Example 11 or Example 12, where the plurality of baseline time periods constitutes all of the baseline time periods within the baseline time window.

Example 14 is the system of either Example 11 or Example 12, where the plurality of baseline time periods does not constitute all of the baseline time periods within the baseline time window.

Example 15 is the system of Example 14, where the aggregation operation includes a counting operation; and the plurality of baseline time periods does not include any time periods within the baseline time window having a zero count of instances corresponding to the detection set.

Example 16 is the system of any of the Examples 11-15, the operations further including receiving a detection-set specification via a user interface, and responsively setting the detection set for the aggregation operation based at least in part on the received detection-set specification.

Example 17 is the system of any of the Examples 11-16, where determining, based on at least the Nth-percentile baseline result and the subject result, whether the subject result indicates the alert condition for the detection set for the subject time period includes: generating a modified Nth-percentile baseline result based on the Nth-percentile baseline result, where generating the modified Nth-percentile baseline result based on the Nth-percentile baseline result comprises multiplying the Nth-percentile baseline result by a scaling coefficient; comparing the subject result to the modified Nth-percentile baseline result; determining whether the subject result indicates an alert condition for the detection set for the subject time period based on the comparing.

Example 18 is the system of any of the Examples 11-17, the operations further including receiving a first-duration specification via a user interface, and responsively setting the first duration for the aggregation operation based at least in part on the received first-duration specification.

Example 19 is the system of any of the Examples 11-18, the operations further including receiving a time-window-duration specification via a user interface, and responsively setting the baseline time window for the aggregation operation based at least in part on the received time-window-duration specification.

Example 20 is the system of any of the Examples 11-19, where outputting one or more alerts includes outputting one or more alerts to one or more of an alert-distribution platform, a user interface, an alert report, and data storage.

Example 21 is a computer-storage medium containing instructions executable by at least one processor for causing the at least one processor to perform operations including: identifying an Nth-percentile baseline result among a plurality of baseline results of an aggregation operation performed with respect to a detection set of one or more attributes of event records in a database, each baseline result in the plurality of baseline results corresponding to a baseline set of one or more of the event records, each such baseline set corresponding to a baseline time period in a plurality of baseline time periods within a baseline time window, each such baseline time period having a first duration; determining a subject result of the aggregation operation performed with respect to the detection set of one or more attributes of a subject set of one or more event records in the database, the subject set corresponding to a subject time period having the first duration; determining, based on at least the Nth-percentile baseline result and the subject result, whether the subject result indicates an alert condition for the detection set for the subject time period; and based on determining that the subject result indicates the alert condition, outputting one or more alerts.

Example 22 is the computer-storage medium of Example 21, where the Nth-percentile baseline result corresponds to a percentile level N, the method further including receiving a percentile-level indication via a user interface, and responsively setting the percentile level N for the aggregation operation based at least in part on the received percentile-level indication.

Example 23 is the computer-storage medium of either Example 21 or Example 22, where the plurality of baseline time periods constitutes all of the baseline time periods within the baseline time window.

Example 24 is the computer-storage medium of either Example 21 or Example 22, where the plurality of baseline time periods does not constitute all of the baseline time periods within the baseline time window.

Example 25 is the computer-storage medium of Example 24, where the aggregation operation includes a counting operation; and the plurality of baseline time periods does not include any time periods within the baseline time window having a zero count of instances corresponding to the detection set.

Example 26 is the computer-storage medium of any of the Examples 21-25, the operations further including receiving a detection-set specification via a user interface, and responsively setting the detection set for the aggregation operation based at least in part on the received detection-set specification.

Example 27 is the computer-storage medium of any of the Examples 21-26, where determining, based on at least the Nth-percentile baseline result and the subject result, whether the subject result indicates the alert condition for the detection set for the subject time period includes: generating a modified Nth-percentile baseline result based on the Nth-percentile baseline result, where generating the modified Nth-percentile baseline result based on the Nth-percentile baseline result comprises multiplying the Nth-percentile baseline result by a scaling coefficient; comparing the subject result to the modified Nth-percentile baseline result; determining whether the subject result indicates an alert condition for the detection set for the subject time period based on the comparing.

Example 28 is the computer-storage medium of any of the Examples 21-27, the operations further including receiving a first-duration specification via a user interface, and responsively setting the first duration for the aggregation operation based at least in part on the received first-duration specification.

Example 29 is the computer-storage medium of any of the Examples 21-28, the operations further including receiving a time-window-duration specification via a user interface, and responsively setting the baseline time window for the aggregation operation based at least in part on the received time-window-duration specification.

Example 30 is the computer-storage medium of any of the Examples 21-29, where outputting one or more alerts includes outputting one or more alerts to one or more of an alert-distribution platform, a user interface, an alert report, and data storage.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the term or phrase.

It is further noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

Many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays (FPGAs), programmable array logic, programmable logic devices, and/or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method comprising:

generating a plurality of baseline results of an aggregation operation performed with respect to a detection set of one or more attributes of event records in a database, each baseline result in the plurality of baseline results corresponding to a baseline set of one or more of the event records, each such baseline set corresponding to a baseline time period in a plurality of baseline time periods within a baseline time window, each such baseline time period having a first duration;

applying a statistical function to the plurality of baseline results to select a particular baseline result of the plurality of baseline results, the particular baseline result that is selected representing a particular baseline set of the one or more of the event records that is associated with a particular baseline time period of the plurality of baseline time periods;

determining a subject result of the aggregation operation performed with respect to the detection set of one or more attributes of a subject set of one or more event records in the database, the subject set corresponding to a subject time period having the first duration;

determining, based on at least the particular baseline result and the subject result, whether the subject result indicates an alert condition for the detection set for the subject time period by performing operations comprising:

generating a modified baseline result based on the particular baseline result by multiplying the particular baseline result by a scaling coefficient;

comparing the subject result to the modified baseline result; and determining whether the subject result indicates an alert condition for the detection set for the subject time period based on the comparison; and based on determining that the subject result indicates the alert condition, outputting one or more alerts.

2. The method of claim 1, wherein the statistical function comprises a percentile level N, the method further comprising receiving input from a user that specifies a percentile-level indication via a user interface, and responsively setting the percentile level N for the aggregation operation based at least in part on the received percentile-level indication of the received input from the user.

3. The method of claim 1, wherein the plurality of baseline time periods constitutes all of the baseline time periods within the baseline time window.

4. The method of claim 1, wherein the plurality of baseline time periods does not constitute all of the baseline time periods within the baseline time window.

5. The method of claim 4, wherein:
the aggregation operation comprises a counting operation; and
the plurality of baseline time periods does not include any time periods within the baseline time window having a zero count of instances corresponding to the detection set.

6. The method of claim 1, further comprising receiving a detection-set specification via a user interface, and responsively setting the detection set for the aggregation operation based at least in part on the received detection-set specification.

7. The method of claim 1, further comprising receiving a first-duration specification via a user interface, and responsively setting the first duration for the aggregation operation based at least in part on the received first-duration specification.

8. The method of claim 1, further comprising receiving input from a user that specifies a value for via a user interface the baseline time window, wherein the plurality of baseline results are generated responsive to the input from the user that specifies the value of the baseline time window.

9. The method of claim 1, wherein outputting one or more alerts comprises outputting one or more alerts to one or more of an alert-distribution platform, a user interface, an alert report, and data storage.

10. A system comprising:
at least one processor; and
one or more non-transitory computer readable storage media containing instructions executable by the at least one processor for causing the at least one processor to perform operations comprising:
generating a plurality of baseline results of an aggregation operation performed with respect to a detection set of one or more attributes of event records in a database, each baseline result in the plurality of baseline results corresponding to a baseline set of one or more of the event records, each such baseline set corresponding to a baseline time period in a plurality of baseline time periods within a baseline time window, each such baseline time period having a first duration;
applying a statistical function to the plurality of baseline results to select a particular baseline result of the plurality of baseline results, the particular baseline result that is selected representing a particular baseline set of the one or more of the event records that is associated with a particular baseline time period of the plurality of baseline time periods;
determining a subject result of the aggregation operation performed with respect to the detection set of one or more attributes of a subject set of one or more event records in the database, the subject set corresponding to a subject time period having the first duration;
determining, based on at least the particular baseline result and the subject result, whether the subject result indicates an alert condition for the detection set for the subject time period by performing operations comprising:
generating a modified baseline result based on the particular baseline result by multiplying the particular baseline result by a scaling coefficient;
comparing the subject result to the modified baseline result; and
determining whether the subject result indicates an alert condition for the detection set for the subject time period based on the comparison; and
based on determining that the subject result indicates the alert condition, outputting one or more alerts.

11. The system of claim 10, wherein applying the statistical function comprises:
sorting the plurality of baseline results in a list; and
selecting from list of the sorted plurality of baseline results the particular baseline result that is within a specified distance of a top of the list.

12. The system of claim 11, wherein the specified distance is selected by a user via a user interface.

13. The system of claim 10, wherein the plurality of baseline time periods does not constitute all of the baseline time periods within the baseline time window.

14. The system of claim 13, wherein:
the aggregation operation comprises a counting operation; and
the plurality of baseline time periods does not include any time periods within the baseline time window having a zero count of instances corresponding to the detection set.

15. The system of claim 10, the operations further comprising identifying a collection of baseline results having values that transgress a threshold, wherein the statistical function is applied to the identified collection of baseline results.

16. The system of claim 10, the operations further comprising receiving a first-duration specification via a user interface, and responsively setting the first duration for the aggregation operation based at least in part on the received first-duration specification.

17. The system of claim 10, wherein at least one of the plurality of baseline time periods overlaps with at least one other baseline time period of the plurality of baseline time periods.

18. The system of claim 10, wherein outputting one or more alerts comprises outputting one or more alerts to one or more of an alert-distribution platform, a user interface, an alert report, and data storage.

19. A computer-storage medium containing instructions executable by at least one processor for causing the at least one processor to perform operations comprising:
generating a plurality of baseline results of an aggregation operation performed with respect to a detection set of one or more attributes of event records in a database, each baseline result in the plurality of baseline results corresponding to a baseline set of one or more of the event records, each such baseline set corresponding to a baseline time period in a plurality of baseline time periods within a baseline time window, each such baseline time period having a first duration;
applying a statistical function to the plurality of baseline results to select a particular baseline result of the plurality of baseline results, the particular baseline result that is selected representing a particular baseline set of the one or more of the event records that is associated with a particular baseline time period of the plurality of baseline time periods;

determining a subject result of the aggregation operation performed with respect to the detection set of one or more attributes of a subject set of one or more event records in the database, the subject set corresponding to a subject time period having the first duration;

determining, based on at least the particular baseline result and the subject result, whether the subject result indicates an alert condition for the detection set for the subject time period by performing operations comprising:

generating a modified baseline result based on the particular baseline result by multiplying the particular baseline result by a scaling coefficient;

comparing the subject result to the modified baseline result; and determining whether the subject result indicates an alert condition for the detection set for the subject time period based on the comparison; and based on determining that the subject result indicates the alert condition, outputting one or more alerts.

20. The computer-storage medium of claim 19, wherein the baseline result corresponds to a percentile level N, the method further comprising receiving a percentile-level indication via a user interface, and responsively setting the percentile level N for the aggregation operation based at least in part on the received percentile-level indication.

21. The computer-storage medium of claim 19, wherein the plurality of baseline time periods constitutes all of the baseline time periods within the baseline time window.

22. The computer-storage medium of claim 19, wherein the plurality of baseline time periods does not constitute all of the baseline time periods within the baseline time window.

23. The computer-storage medium of claim 22, wherein:
the aggregation operation comprises a counting operation; and
the plurality of baseline time periods does not include any time periods within the baseline time window having a zero count of instances corresponding to the detection set.

24. The computer-storage medium of claim 19, the operations further comprising receiving a detection-set specification via a user interface, and responsively setting the detection set for the aggregation operation based at least in part on the received detection-set specification.

25. The computer-storage medium of claim 19, the operations further comprising receiving a first-duration specification via a user interface, and responsively setting the first duration for the aggregation operation based at least in part on the received first-duration specification.

26. The computer-storage medium of claim 19, the operations further comprising receiving a time-window-duration specification via a user interface, and responsively setting the baseline time window for the aggregation operation based at least in part on the received time-window-duration specification.

27. The computer-storage medium of claim 19, wherein outputting one or more alerts comprises outputting one or more alerts to one or more of an alert-distribution platform, a user interface, an alert report, and data storage.

\* \* \* \* \*